US009060399B2

(12) United States Patent
Lin et al.

(10) Patent No.: US 9,060,399 B2
(45) Date of Patent: Jun. 16, 2015

(54) OPERATING CIRCUIT APPLIED TO BACKLIGHT AND ASSOCIATED METHOD

(75) Inventors: Shu-Min Lin, Taichung (TW); Jyi-Si Lo, Taoyuan County (TW); Ying-Hsi Lin, Hsin-Chu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 481 days.

(21) Appl. No.: 13/468,001

(22) Filed: May 9, 2012

(65) Prior Publication Data

US 2012/0293084 A1 Nov. 22, 2012

(30) Foreign Application Priority Data

May 19, 2011 (TW) .............................. 100117654 A

(51) Int. Cl.
H05B 33/08 (2006.01)
(52) U.S. Cl.
CPC ........ H05B 33/0827 (2013.01); H05B 33/0815 (2013.01); Y02B 20/347 (2013.01)
(58) Field of Classification Search
CPC ........... H05B 33/0815; H05B 33/0827; H05B 37/02; Y02B 20/347
See application file for complete search history.

(56) References Cited

U.S. PATENT DOCUMENTS

| 2008/0094008 A1* | 4/2008 | Liu ................................ 315/294 |
| 2008/0144236 A1* | 6/2008 | Chiang et al. .................... 361/18 |
| 2010/0264837 A1* | 10/2010 | Zhao .............................. 315/189 |

FOREIGN PATENT DOCUMENTS

| CN | 101207958 A | 6/2008 |
| TW | 200820177 | 5/2008 |
| TW | 200822029 | 5/2008 |
| TW | 200832331 | 8/2008 |
| TW | 201044916 | 12/2010 |

* cited by examiner

Primary Examiner — Tuyet Vo
Assistant Examiner — Henry Luong
(74) Attorney, Agent, or Firm — Winston Hsu; Scott Margo

(57) ABSTRACT

An operating circuit applied to a backlight is provided, where the backlight includes a plurality of lighting elements, and the operating circuit includes a plurality of current control circuits, a plurality of switches, a minimum voltage selector, a supply voltage generating circuit and a control unit. The current control circuits are coupled to the lighting elements via a plurality of nodes, respectively. The switches are coupled to the nodes, respectively. The minimum voltage selector is utilized for receiving at least a portion of voltages of the plurality of nodes, and selecting a minimum voltage among the received voltages. The supply voltage generating circuit is utilized for generating a supply voltage of the lighting elements according to the minimum voltage. For each of the switches, the control unit determines an on/off state of the switch by determining whether the corresponding lighting element is an open circuit or not.

8 Claims, 3 Drawing Sheets

US 9,060,399 B2

OPERATING CIRCUIT APPLIED TO BACKLIGHT AND ASSOCIATED METHOD

BACKGROUND OF THE INVENTION

1. Field of the Invention

The present invention relates to an operating circuit applied to a backlight, and more particularly, to an operating circuit applied to a light-emitting diode (LED) backlight.

2. Description of the Prior Art

Please refer to FIG. 1, which illustrates a prior art backlight module control system 100. As shown in FIG. 1, the backlight module control system 100 includes a plurality of LED strings 110_1-110_4, a plurality of current control circuits 120_1-120_4, a minimum voltage selector 130 and a voltage booster 140, where each of the LED strings 110_1-110_4 includes a plurality of LEDs, and each of the current control circuits 120_1-120_4 includes an amplifier (122_1-122_4), a transistor (M1-M4) and a resistor R.

Because each of the LEDs has a semiconductor process variation, the cross voltages of the LED strings 110_1-110_4 are different while the LED strings 110_1-110_4 are working. To confirm each of the LED strings 110_1-110_4 has enough cross voltage while working, the minimum voltage selector 130 selects a minimum voltage among the voltages $V_{DET1}$-$V_{DET4}$ of the nodes N1-N4, and the voltage booster 140 determines a supply voltage Vo of the LED strings 110_1-110_4 according to the minimum voltage. In other words, the backlight module control system 100 determines the supply voltage Vo of the LED strings 110_1-110_4 by referring to the LED string having a largest cross voltage so as to make each of the LED strings 110_1-110_4 have enough cross voltage.

However, when one the LED strings 110_1-110_4 is burned out (i.e., being an open circuit), the corresponding voltage $V_{DET}$ will always be zero. Then, because the minimum voltage $V_{MIN}$ outputted from the minimum voltage selector 130 is always zero, the voltage booster 140 will continuously boost the supply voltage Vo until an over voltage protection mechanism is triggered to close the operations of the backlight module control system 100, causing the failure of the control mechanism.

SUMMARY OF THE INVENTION

It is therefore an objective of the present invention to provide an operating circuit applied to a backlight to prevent the control mechanism from being failed due to the burned out LED.

According to one embodiment of the present invention, an operating circuit applied to a backlight is provided, where the backlight includes a plurality of lighting elements, and the operating circuit includes a plurality of current control circuits, a plurality of switches, a minimum voltage selector, a supply voltage generating circuit and a control unit. The current control circuits are coupled to the lighting elements via a plurality of nodes, respectively. The switches are coupled to the nodes, respectively. The minimum voltage selector is utilized for receiving at least a portion of voltages of the plurality of nodes, and selecting a minimum voltage among the received voltages. The supply voltage generating circuit is utilized for generating a supply voltage of the lighting elements according to the minimum voltage. For each of the switches, the control unit determines an on/off state of the switch by determining whether the corresponding lighting element is an open circuit or not.

According to another embodiment of the present invention, an operating method applied to a backlight is provided, where the backlight comprises a plurality of lighting elements, each of the lighting elements comprises at least one lighting unit, and the operating method comprises: providing a plurality of current control circuits, coupled to the plurality of lighting elements via a plurality of nodes, respectively; providing a plurality of switches, coupled to the plurality of nodes, respectively; boosting a supply voltage to make the supply voltage greater than a required cross voltage of the plurality of lighting elements; for each of the switches, determining an on/off state of the switch by determining whether the corresponding lighting element is an open circuit; receiving at least a portion of voltages of the nodes, and select a minimum voltage among the received voltages; and adjusting the supply voltage according to the minimum voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
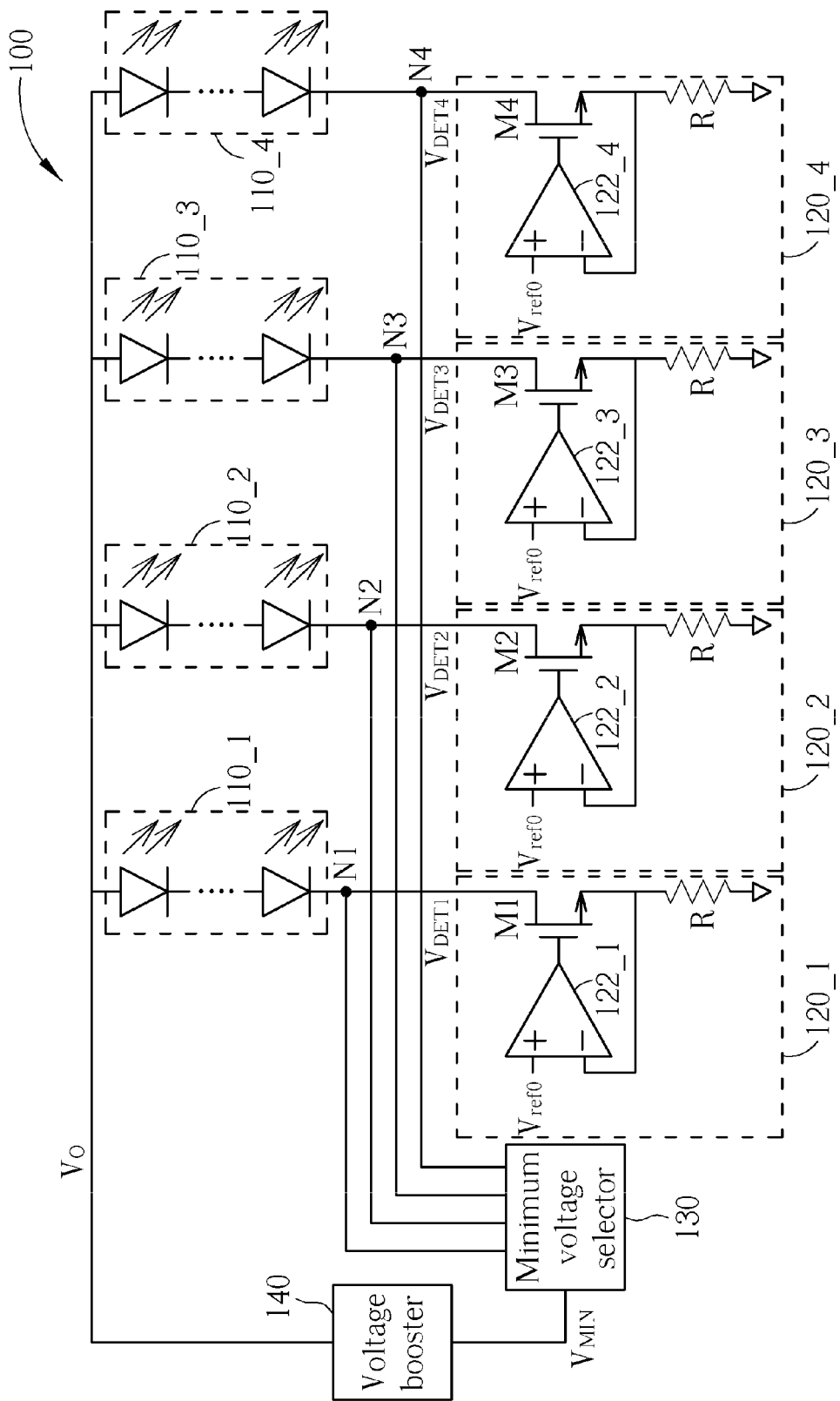
FIG. 1 is a diagram illustrating a prior art backlight module control system.
Figure 2:
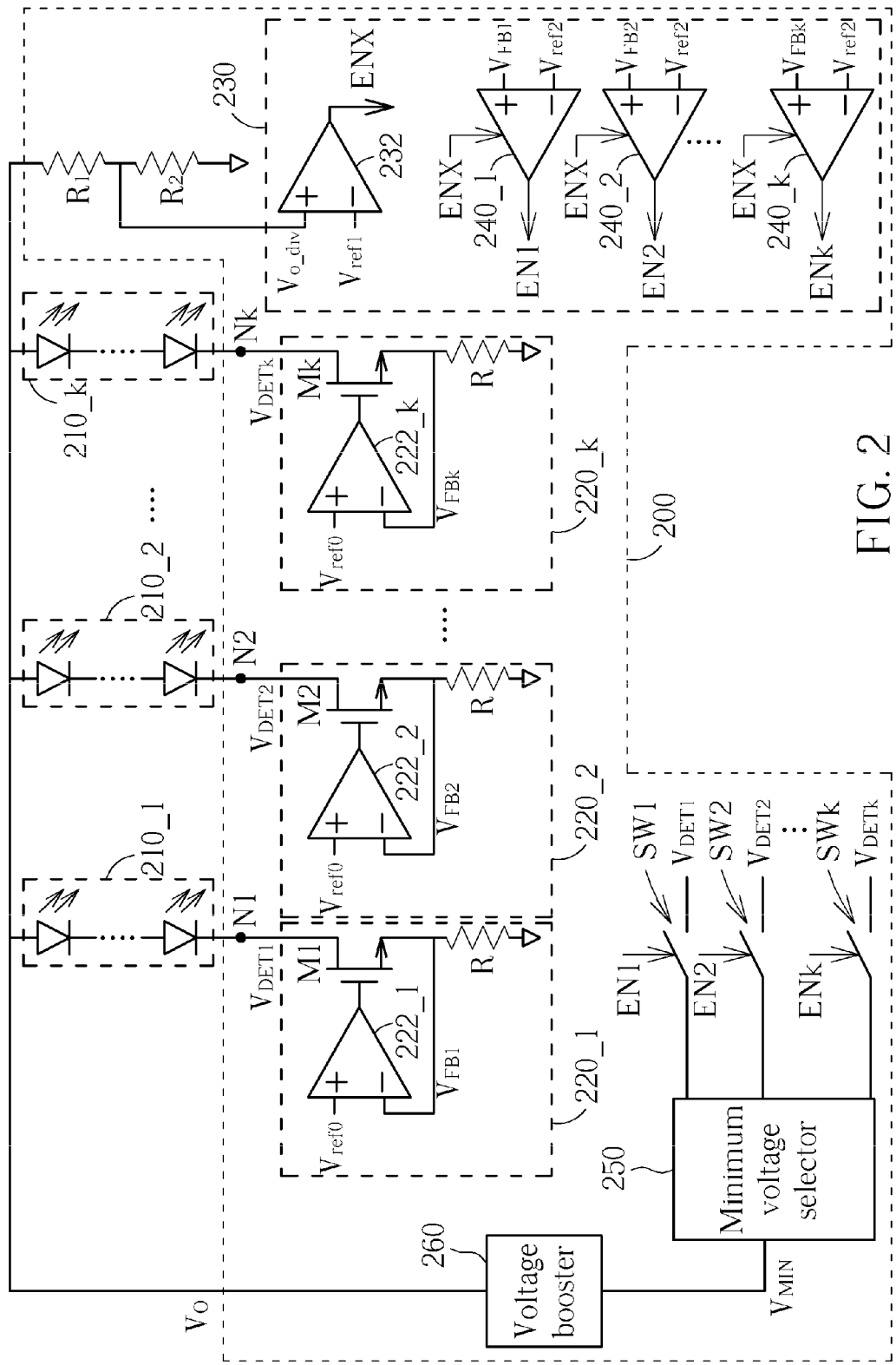
FIG. 2 is a diagram illustrating an operating circuit applied to a backlight according to one embodiment of the present invention.

Please refer to FIG. 2, which illustrates an operating circuit 200 applied to a backlight according to one embodiment of the present invention, where the backlight includes a plurality of lighting elements, and each of the lighting elements includes at least one lighting unit. In this embodiment, each lighting unit is an LED, and the lighting elements are LED strings 210_1-210_k. As shown in FIG. 2, the operating circuit 200 includes a plurality of current control circuits 220_1-220_k, two resistors $R_1$ and $R_2$, a control unit 230, a plurality of switches SW1-SWk, a minimum voltage selector 250 and a supply voltage generating circuit, wherein the supply voltage generating circuit is implemented by a voltage booster 260 in this embodiment. The current control circuit 220_1-220_k are coupled to the LED strings 210_1-210_k via nodes N1-Nk, respectively, and each of the current control circuit 220_1-220_k includes an amplifier (222_1-222_k), a transistor (M1-Mk) and a resistor R. The control unit 230 includes a first comparator 232 and a plurality of second comparators 240_1-240_k.

The resistors $R_1$ and $R_2$ divide the supply voltage Vo of the LED strings 210_1-210_k to generate a divided voltage Vo_div. Then the first comparator 232 compares the divided voltage Vo_div with a first reference voltage $V_{ref1}$ to generate a comparison signal ENX. The first reference voltage $V_{ref1}$ can be set according to a standard cross voltage of the LED strings 210_1-210_k provided by the client. In one embodiment, the first reference voltage $V_{ref1}$ is set a little lower than a divided standard cross voltage divided by the resistors $R_1$ and $R_2$, and when the divided voltage Vo_div is greater than the first reference voltage $V_{ref1}$, it is represented that the supply voltage Vo is greater than the required cross voltage of the LED strings 210_1-210_k and all the LED strings 210_1-210_k can be operated normally, at this time, the comparison signal ENX outputted from the first comparator 232 is "1", and the second comparators 240_1-240_k are enabled. On the other hand, when the divided voltage Vo_div is not greater than the first reference voltage $V_{ref1}$, it is represented that the cross voltages of LED strings 210_1-210_k may not be large enough to make all the LED strings 210_1-210_k operated normally, at this time, the comparison signal ENX outputted from the first comparator 232 is "0", and the second comparators 240_1-240_k are disabled.

When the second comparators 240_1-240_k are enabled, the second comparators 240_1-240_k compare a plurality of feedback voltages $V_{FB1}$-$V_{FBk}$ of the amplifiers 222_1-222_k with a second reference voltage $V_{ref2}$ to determine if one or more LED strings 210_1-210_k are burned out (i.e., be an open circuit) to generate switch control signals EN1-ENk to control the switches SW1-SWk, respectively. For example, if the LED string 210_1 is open, the voltage $V_{DET1}$ of the node N1 and the feedback voltage $V_{FB1}$ will be zero, and the switch control signal EN1 outputted from the second comparator 240_1 is "0", and the switch SW1 is switched off. If the LED string 210_1 is not open, the voltage $V_{DET1}$ of the node N1 and the feedback voltage $V_{FB1}$ will be greater than zero (because the input terminals of the amplifier 222_1 are virtual ground, the feedback voltage $V_{FB1}$ is equal to a reference voltage $V_{ref0}$), and the switch control signal EN1 outputted from the second comparator 240_1 is "1", and the switch SW1 is switched on. In a preferred embodiment, the second reference voltage $V_{ref2}$ is set to be 1 V, and each of the LED strings 210_1-210_k can be determined as an open circuit by determining whether the corresponding feedback voltage ($V_{Fb1}$-$V_{FBk}$) is lower than the second reference voltage $V_{ref2}$. In other embodiments, the second reference voltage $V_{ref2}$ can be any value between the reference voltage $V_{ref0}$ and 0V.

In other embodiments, the first reference voltage $V_{ref1}$ is set a little greater than the divided standard cross voltage divided by the resistors $R_1$ and $R_2$. That is, the second comparators 240_1-240_k are enabled after the supply voltage Vo is boosted. When the second comparators 240_1-240_k are disabled, the switches SW1-SWk are kept switched on, and only after the second comparators 240_1-240_k are enabled, the switches SW1-SWk are controlled by the switch control signals EN1-ENk, respectively.

In light of above, by referring to the statuses of the switches SW1-SWk respectively controlled by the switch control signals EN1-ENk, the minimum voltage selector 250 receives at least a portion of the voltages $V_{DET1}$-$V_{DETk}$ of the nodes N1-Nk. If the LED string 210_1 is open, the switch control signal EN1 switches off the switch SW1 to make the minimum voltage selector 250 not receive the voltage $V_{DET1}$, and the switch control signals EN2-ENk switch on the switches SW2-SWk, respectively, to make the minimum voltage selector 250 receive the voltages $V_{DET2}$-$V_{DETk}$. Therefore, the minimum voltage selector 250 can output the correct minimum voltage $V_{MIN}$ to the voltage booster 260 to adjust the supply voltage correctly.

During the period that the divided voltage Vo_div is not greater than the first reference voltage $V_{ref1}$ (e.g., the operating circuit 200 is enabled a short time ago), it is meant that the supply voltage Vo is lower than the required cross voltage of the LED strings 210_1-210_k. As the cross voltages of the LED strings 210_1-210_k are not enough, the switches SW1-SWk are switched off, the minimum voltage selector 250 does not receive any one of the voltages $V_{DET1}$-$V_{DETk}$ of the nodes N1-Nk, the minimum voltage selector 250 does not output the minimum voltage $V_{MIN}$, and the voltage booster 260 does not receive the minimum voltage $V_{MIN}$. In this embodiment, the voltage booster 260 has a fast boosting mechanism (not shown) to fast boost the supply voltage Vo when the voltage booster 260 does not receive the minimum voltage $V_{MIN}$. After the divided voltage Vo_div is greater than the first reference voltage $V_{ref1}$, the LED open circuit determining mechanism is enabled, the minimum voltage selector 250 starts to provide the minimum voltage $V_{MIN}$, and the voltage booster 260 starts to adjust the supply voltage Vo according to the minimum voltage $V_{MIN}$.

In addition, in the embodiment shown in FIG. 2, the switch control signals EN1-ENk are generating by comparing the feedback voltages $V_{FB1}$-$V_{FBk}$ with the second reference voltages $V_{ref2}$, respectively. However, it is not meant to be a limitation of the present invention. In another embodiment of the present invention, the second comparators 240_1-240_k can compare the voltages $V_{DET1}$-$V_{DETk}$ with the second reference voltage $V_{ref2}$ to generate the switch control signals EN1-ENk, respectively. This alternative design should fall within the scope of the present invention.

Figure 3:
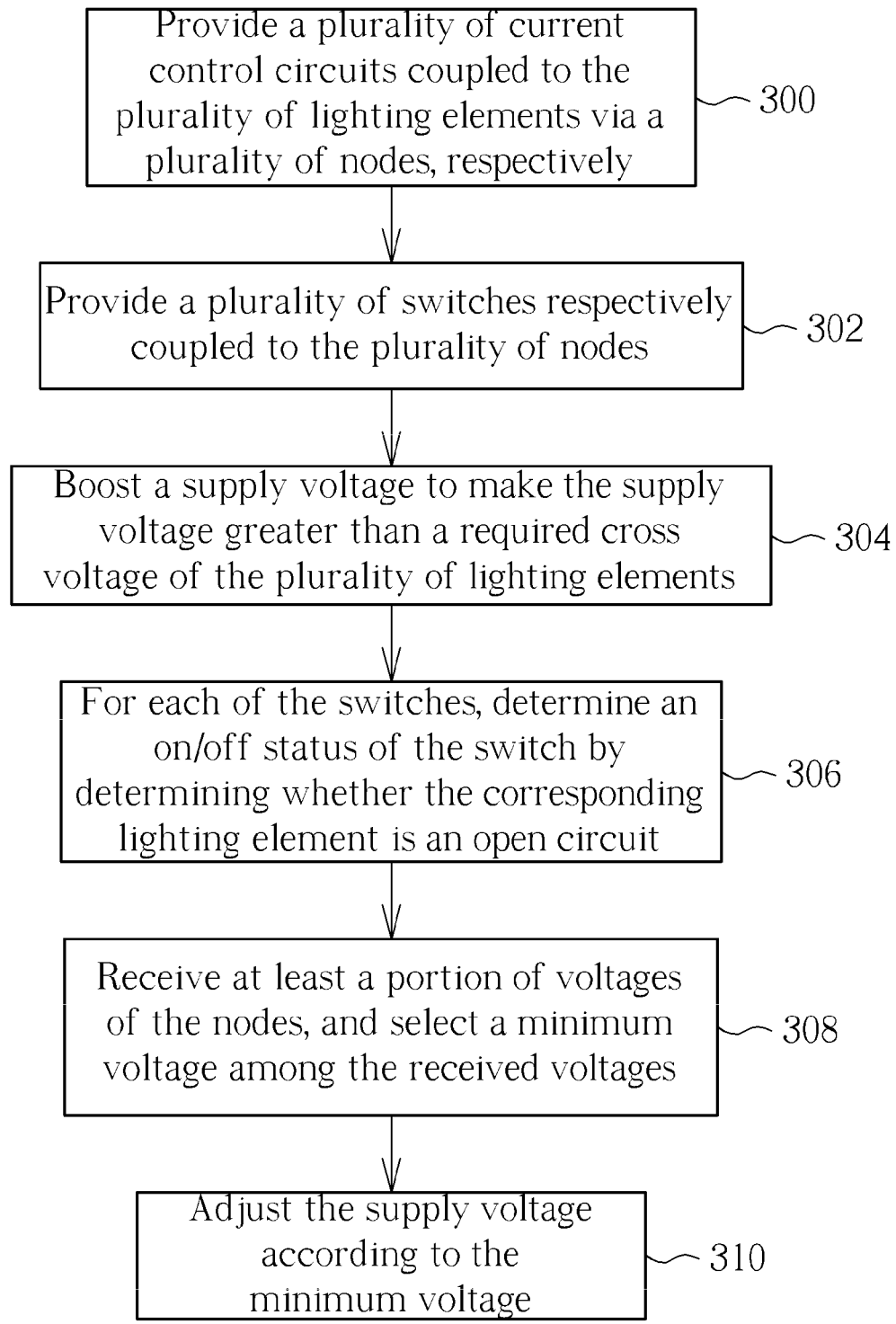
FIG. 3 is a flowchart of an operating method applied to a backlight according to one embodiment of the present invention.

Please refer to FIG. 3, which is a flowchart of an operating method applied to a backlight according to one embodiment of the present invention, where the backlight includes a plurality of lighting elements, and each of the lighting elements includes at least one lighting unit. Referring to FIG. 2 and FIG. 3, the flow is described as follows.

Step 300: provide a plurality of current control circuits coupled to the plurality of lighting elements via a plurality of nodes, respectively.

Step 302: provide a plurality of switches respectively coupled to the plurality of nodes.

Step 304: boost a supply voltage to make the supply voltage greater than a required cross voltage of the plurality of lighting elements.

Step 306: for each of the switches, determine an on/off state of the switch by determining whether the corresponding lighting element is an open circuit.

Step 308: receive at least a portion of voltages of the nodes, and select a minimum voltage among the received voltages.

Step 310: Adjust the supply voltage according to the minimum voltage.

Briefly summarized, in the operating circuit and associated method of the present invention, a LED string is detected to determine whether the LED string is an open circuit. Then, if the LED string is determined as the open circuit, its corresponding voltage will not be used to determine the minimum voltage. Therefore, the operating circuit can determine the supply voltage of the LED strings correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operating circuit applied to a backlight, wherein the backlight comprises a plurality of lighting elements, each of the lighting elements comprises at least one lighting unit, and the operating circuit comprises:

a plurality of current control circuits, coupled to the plurality of lighting elements via a plurality of nodes, respectively;

a plurality of switches, coupled to the plurality of nodes, respectively;

a minimum voltage selector, coupled to the plurality of switches, for receiving at least a portion of voltages of the plurality of nodes, and selecting a minimum voltage among the received voltages;

a supply voltage generating circuit, coupled to the minimum voltage selector, for generating a supply voltage of the plurality of lighting elements according to the minimum voltage; and a control unit, coupled to the plurality of switches and the supply voltage generating circuit, wherein for each of the switches, the control unit determines an on/off state of the switch by determining whether the corresponding lighting element is an open circuit or not;

wherein the control circuit comprises:

a plurality of second comparators, for generating a plurality of switch control signals by comparing the voltages of the plurality of nodes with a second reference voltage, respectively; and a first comparator, for determining whether to enable the plurality of second comparators or not by detecting if the supply voltage is greater than a first reference voltage, wherein when the supply voltage is greater than the first reference voltage, the second comparators are enabled; and when the supply voltage is not greater than the first reference voltage, the second comparators are disabled;

wherein the plurality of switch control signals are utilized for switching on or switching off the plurality of switches, respectively.

2. The operating circuit of claim 1, wherein the voltage corresponding to the node is the voltage of the node.

3. The operating circuit of claim 1, wherein the voltage corresponding to the node is a feedback voltage of the corresponding current control circuit.

4. The operating circuit of claim 1, wherein each light unit is a LED, and each of the lighting elements is a LED string.

5. An operating method applied to a backlight, wherein the backlight comprises a plurality of lighting elements, each of the lighting elements comprises at least one lighting unit, and the operating method comprises:

providing a plurality of current control circuits, coupled to the plurality of lighting elements via a plurality of nodes, respectively;

providing a plurality of switches, coupled to the plurality of nodes, respectively;

boosting a supply voltage to make the supply voltage greater than a required cross voltage of the plurality of lighting elements;

for each of the switches, determining an on/off state of the switch by determining whether the corresponding lighting element is an open circuit;

receiving at least a portion of voltages of the nodes, and select a minimum voltage among the received voltages; and adjusting the supply voltage according to the minimum voltage;

wherein the step of determining the on/off state of the switch by determining whether the corresponding lighting element is the open circuit comprises:

determining whether a divided voltage of the supply voltage is greater than a first reference voltage to generate a comparison signal;

providing a plurality of second comparators, wherein when the comparison signal indicates that the divided voltage of the supply voltage is greater than the first reference voltage, the plurality of second comparators are enabled, and when the comparison signal indicates that the divided voltage of the supply voltage is not greater than the first reference voltage, the plurality of second comparators are disabled;

wherein when the plurality of second comparators are enabled, the plurality of second comparators generate a plurality of switch control signals by comparing the voltages of the plurality of nodes with a second reference voltage, respectively, where the plurality of switch control signals are utilized for switching on or switching off the plurality of switches, respectively.

6. The operating method of claim 5, wherein the voltage corresponding to the node is the voltage of the node.

7. The operating method of claim 5, wherein the voltage corresponding to the node is a feedback voltage of the corresponding current control circuit.

8. The operating method of claim 5, wherein each light unit is a LED, and each of the lighting elements is a LED string.

* * * * *